United States Patent
Kasselmann

[15] 3,640,184
[45] Feb. 8, 1972

[54] HYDRAULIC SERVO ACTUATOR ARRANGEMENT FOR AN ADAPTIVE STEERING SYSTEM

[72] Inventor: John T. Kasselmann, Southfield, Mich.
[73] Assignee: The Bendix Corporation
[22] Filed: Mar. 20, 1970
[21] Appl. No.: 21,323

[52] U.S. Cl. ..................................91/387, 91/417, 91/469
[51] Int. Cl. ..................................F15b 13/16, F15b 15/17
[58] Field of Search ..............................91/387, 47, 469, 417

[56] References Cited

UNITED STATES PATENTS

| | | | |
|---|---|---|---|
| 2,247,989 | 7/1941 | Cita | 91/387 |
| 2,920,607 | 1/1960 | Barkan | 91/469 |
| 3,289,548 | 12/1966 | Jensen et al. | 91/387 |
| 3,316,815 | 5/1967 | Chapin et al. | 91/387 |

FOREIGN PATENTS OR APPLICATIONS

| | | | |
|---|---|---|---|
| 426,141 | 10/1947 | Italy | 91/387 |
| 79,979 | 1950 | Czechoslovakia | 91/469 |

*Primary Examiner*—Paul E. Maslousky
*Attorney*—John R. Benefiel and Plante, Hartz, Smith and Thompson

[57] ABSTRACT

A servo actuator arrangement for incorporating an adaptive steering system into a conventional power steering mechanism, utilizing a fluidic signal controlled three-way open-center servo valve and a pressure relief bypass in parallel with each other, both in series with the power steering hydraulic supply circuit in order to eliminate the need for a separate actuator fluid pressure source. The servo actuator features a resilient, through-the-port mechanical feedback, and also features a connecting arrangement providing support for the rest of the steering linkage so as to be capable of being inserted into the existing steering gear without additional supports.

3 Claims, 2 Drawing Figures

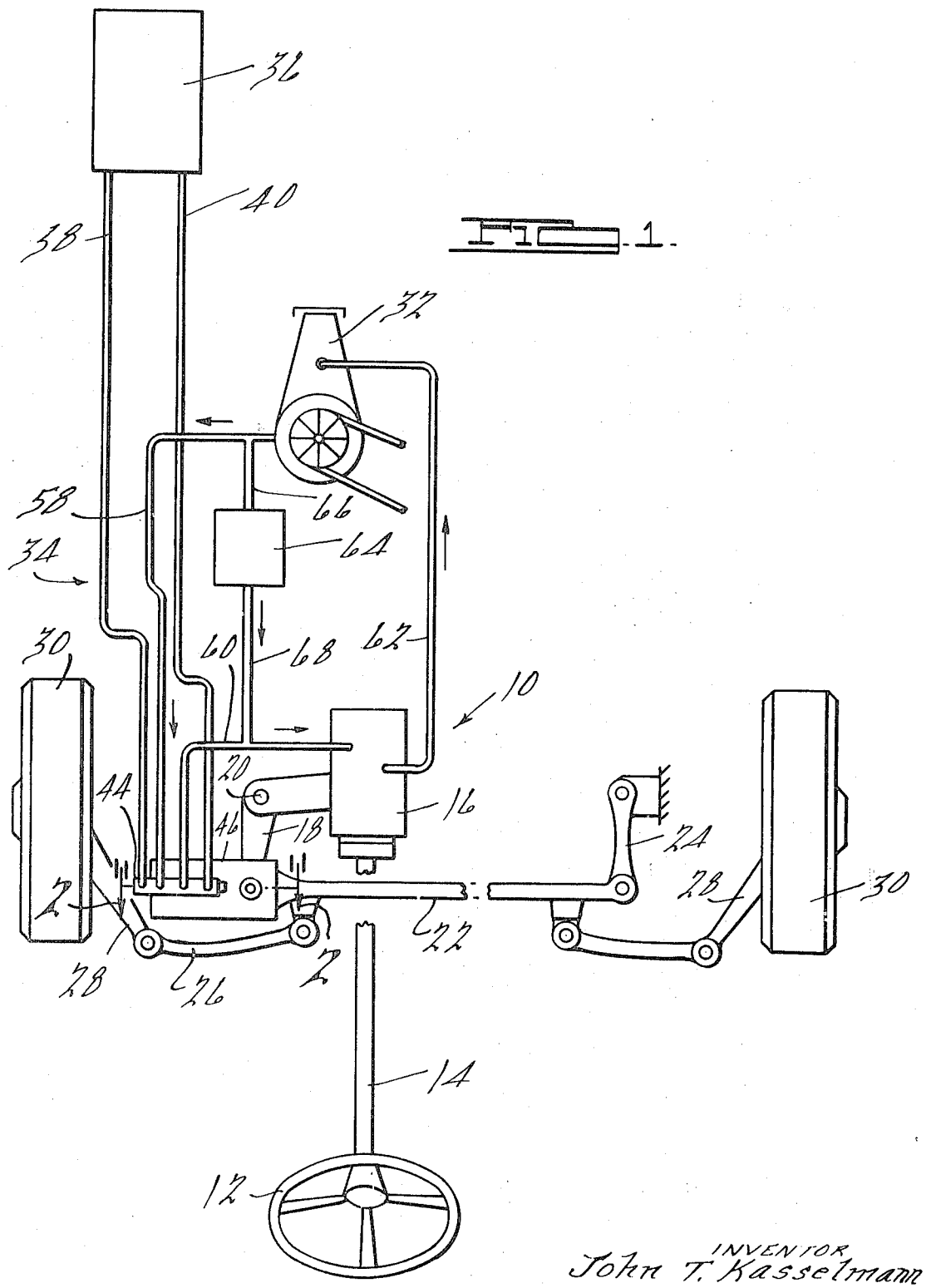

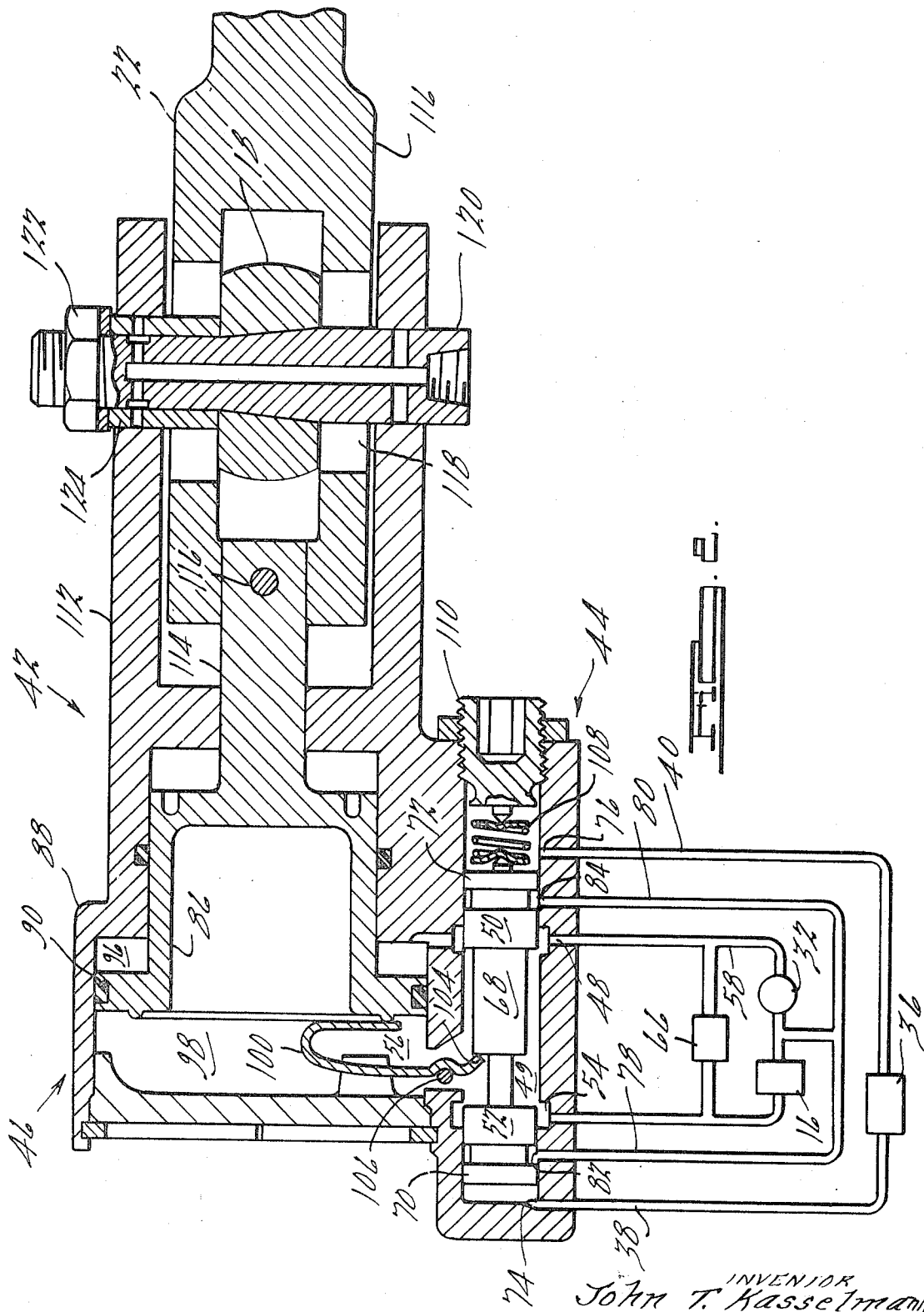

HYDRAULIC SERVO ACTUATOR ARRANGEMENT FOR AN ADAPTIVE STEERING SYSTEM

BACKGROUND OF THE INVENTION

This invention relates generally to adaptive steering systems, and more specifically to a hydraulic servo actuator arrangement capable of being incorporated into a conventional power steering mechanism with a minimum of extra components.

Adaptive steering systems, in which the effect of lateral disturbances on a vehicle are automatically compensated for by a countering movement of the steering gear impressed thereon by a servo actuator mechanism, have been proposed, representatives of such systems being disclosed in copending U.S. applications Ser. No. 792,238, Ser. No. 792,243, and Ser. No. 792,904, all assigned to the assignee of the present application. However, the cost and complexity of such a system must be reduced in order to bring these systems into widespread practical use.

One component in which such simplication would be desirable is the servo actuator used to produce the corrective countering movement of the steering gear. Elimination of the separate pressure source, simplication of the complex position feedback arrangement of the prior art systems and the complicated linkages used to impress the countering compensating movements onto the steering system by the servo actuator, all would be highly beneficial in accomplishing this end.

Therefore, it is an object of the present invention to provide such a servo actuator which may be incorporated into existing power steering systems without requiring an additional fluid power source and will not interfere with the normal operation of the power steering unit.

It is another object of the present invention to provide a simplified connection for incorporating the servo actuator into the steering linkage without the need for separate supporting structure.

SUMMARY OF THE INVENTION

These and other objects which will become apparent upon a reading of the specification and claims are accomplished by providing a fluidic signal controlled three-way open-center servo valve in parallel with a pressure relief bypass, with both of these connected in series in the power steering supply line. A simplified mechanical through-the-port feedback is provided between the actuator piston and the servo valve, while a link connection with the steering mechanism drag link provides support for the steering linkage.

BRIEF DESCRIPTION OF THE DRAWINGS

FIG. 1 is a schematic representation of the hydraulic servo actuator installation.

FIG. 2 is a view of the section 2—2 in FIG. 1 of the servo actuator together with the associated servo valve and link connection.

DETAILED DESCRIPTION

In the following detailed description, certain specific terminology will be used, and a specific embodiment will be described for the sake of clarity, and in order to provide a clear understanding of the invention, but the invention is not so limited and may be practiced in a variety of forms and embodiments.

Referring to the drawings, and specifically to FIG. 1, a conventional power steering arrangement 10 is depicted, in which turning motions of the steering wheel 12 are transmitted to the steering column 14, which causes an output motion from the power steering unit 16 to produce rotation of the pitman arm 18 about the axis 20. This rotation is transmitted via the steering linkage composed of the drag link 22, idler arm 24, tie rods 36, to the radius arms 28 secured to the vehicle dirigible wheels 30 so as to cause steering movement thereof.

The power steering unit 16 is supplied with fluid pressure from an engine driven pump 32.

The adaptive steering system 34 includes means for generating fluidic correction control signals 36. In the systems disclosed in the applications referred to above, this is comprised of means for generating signals corresponding to the yaw rate of the vehicle in either direction, vehicle speed, and steering wheel travel in either direction, which signals are appropriately combined and amplified to produce a pair of fluidic output signals, differences in which will produce corrective steering movement in one direction or the other, in a manner to be disclosed herein. Since the specific means for generating these signals does not comprise the present invention, it is not felt necessary to describe any such system in detail.

These signals are transmitted via hydraulic lines 38 and 40 to the servo actuator assembly 42. This assembly 42 includes a servo valve 44 and a servo motor 46 according to the present invention.

Referring to FIG. 2, the servo valve 44 is a three-way open-center valve, i.e., fluid pressure is introduced via the supply port 48, passes into the intermediate space 49 between the lands 50 and 52 and out the return port 54. The servomotor 46 is supplied via outlet passage 56 communicating with the space 49.

This design allows the servo valve 44 to be placed in series with the power steering supply via lines 58, 60 and 62 since flow is not normally interrupted by demands of the servomotor 46. In order to insure continued flow to the power steering in the event of excessive pressure demands, i.e., when the land 50 completely or nearly completely blocks the supply port 48, so that insufficient flow for the operating needs of the power steering unit results, a pressure relief bypass valve 64 is provided connected via lines 66 and 68 so as to be in parallel with the servo valve 44. Thus if pressure demands of the servoactuator 42 cause the flow path therethrough to be sufficiently obstructed to cause the pressure drop thereacross to exceed the pressure opening value of the relief valve 66, this valve will open to allow bypass flow to the power steering unit 16, and insure sufficient flow at all times to operate the unit 16.

The servo valve 44 includes a valve spool 68 disposed in the bore 69, having lands 70, 72 as well as the previously mentioned lands 50 and 52. This valve spool 68 is stroked by the force created by the differential control pressure applied to the land ends 70, 72 via lines 38, 40 and control ports 74, 76 to continuously block and open the supply and return ports 50, 52, respectively, or vice versa by movement of the valve spool in the bore 69.

High pressure leakage past lands 50 and 52 is returned to the pump 32 via lines 78, 80 and ports 82, 84 in order to avoid any effects on the control pressure values exerted on the valve spool ends.

The servomotor 46 includes a piston 86 slidably disposed in a cylinder housing 88, and having a major diameter 90 and a minor diameter 92. Supply pressure is continuously applied to the annular area of the piston defined by the difference between the area of the major diameter less the area defined by the minor diameter via annular groove 94 communicating with the chamber 96. This biases the piston 86 to the left as viewed in FIG. 2. Thus, variation of the magnitude of the pressure in chamber 49 can cause the piston to move in either direction or remain stationary.

As described supra, the pressure existing in the volume 49 between the lands 50 and 52 is applied to the area of the piston 86 defined by the major diameter via passage 56 communicating with the chamber 98. This pressure will be a function of spool position, due to the open-center design, as well as all restrictions downstream.

In order to relate piston position to that of the spool, a position feedback arrangement is provided comprised of a leaf spring element 100 engaging the piston 86 at 102 and the valve spool 68 at 104, the spring 100 being pivoted at 106. Movement of the piston 86 to the right causes a force to be exerted on the valve spool 68 to return it to the null position, i.e., to the point where the pressure force in chamber 98 is sufficient to balance the force created by pressure in chamber 96. Movement to the left causes a reduction in the spring force, upsetting the force equilibrium on the valve spool 68 and causing the control pressure differential to null the valve spool 68.

The leaf spring 100 utilizes an existing port 56 so that dynamic sealing of the feedback elements is not required.

A centering spring 108 is provided together with an adjusting nut 110 so that the piston 86 may be centered.

Integral with the housing 88 is a bifurcated portion 112, into which extends a piston rod 114 integral with the piston 86. This piston rod 114 is pinned at 116 or otherwise connected to a drag link end 116 which extends into the bifurcation and is welded to one end of the drag link 22. Extending through a clearance slot 118 in the drag link end 114 is a taper pin 120 carried by the portion 112 onto which is drawn one end of the pitman arm 18 by means of the nut 122 and sleeve 124 to create a connection therebetween. Thus, modal movement by rotation about the axis of the pin 120 is allowed between the pitman arm 18 and the drag link 22 is allowed while modal movement by rotation about the axis of the piston 186 and housing 88 is prevented, thus lending support therebetween against this movement.

OPERATION

Under normal steering conditions, motions of the pitman arm 18 are transmitted to the drag link 22 via pin 120, portion 112, housing 88, which acts on the piston 86 due to the hydrostatic lock therebetween to position the transfer motion via rod 114 to the drag link end 116.

In the event the vehicle condition dictates an adaptive corrective steering motion, the control means 36 creates a pressure difference in lines 38 and 40 which causes a pressure imbalance across the valve spool 68, thus causing it to shift either to the right or left depending on the nature of the correction required. This in turn causes either greater or lesser pressure to exist in chamber 98, resulting in a shift of the piston 86 either to the right or the left until the valve spool 68 is nulled by the action of the leaf spring 100.

Movement of the piston 86 causes a shift in the relative position of the housing 88 and piston 86 which by reacting against the pitman arm 18 creates a corresponding axial movement of the drag link 22 via piston rod 144 to produce the corrective steering action. This relative movement is accommodated by the clearance slot 118 in the drag link end 116.

From this description, it can be seen that lateral, axial, and torsional support is provided for the drag link 22 and connected linkage by this connection with the pitman arm 18 while allowing the corrective relative axial movement to occur along the line of action of the piston and cylinder.

It should also be appreciated that this actuating element has been incorporated without the need for a separate fluid supply, and without interfering with the normal operation of the power steering mechanism. In this regard, it should be noted that maximum flow demands of the adaptive steering servo actuator and the power steering unit will normally occur at different times, i.e., during parking and slow sharp turns, power steering flow demand is at a maximum, whereas the adaptive steering would not normally be called into play during these operations. Conversely, at high vehicle speeds when the adaptive steering actuator demand is likely to be at a maximum, the power steering demands are normally at a minimum. Hence, the existing constant flow power steering pumps may be utilized without substantial modification.

It can also be appreciated that an extremely simple servo valve and actuator assembly has been provided which lends itself readily to low-cost, high-volume production as is appropriate in automotive application.

What is claimed is:

1. A servo actuator comprising:
   a source of fluid pressure;
   a fluid motor including a chamber defined in part by a movable member;
   servo valve means including a movable valve member and providing a variable communication between said source of fluid pressure and said fluid motor in response to movement of said valve member, and also including a port communicating with said chamber;
   means causing said movable motor member to move in response to a level of fluid communication produced by movement of said movable valve member;
   control means for applying a force to move said movable valve member;
   feedback means applying a countering force to said valve member in response to responsive movement of said motor member to null said servo valve, said feedback means including a feedback member extending through said port and drivingly connected with said movable motor member and said movable valve member, whereby position feedback is obtained.

2. The servo actuator of claim 1 wherein said feedback member is a pivotally supported leaf spring with one end engaging said movable valve member and another end engaging said movable motor member.

3. The servo actuator of claim 1 wherein said servo valve is a three-way open-center spool valve and wherein said port communicates with said open-center.

* * * * *